United States Patent [19]
Hundeby

[11] Patent Number: 4,858,832
[45] Date of Patent: Aug. 22, 1989

[54] AGRICULTURAL WATER CANNON

[75] Inventor: David R. Hundeby, Saskatoon, Canada

[73] Assignee: Flexi-Coil Limited, Saskatoon, Canada

[21] Appl. No.: 225,301

[22] Filed: Jul. 28, 1988

[51] Int. Cl.$^4$ ............... B05B 1/14; B05B 3/18
[52] U.S. Cl. ................... 239/723; 239/732; 239/742; 239/747; 239/195
[58] Field of Search ............... 239/724, 726, 730, 732, 239/734, 739, 740, 742, 747, 195

[56] References Cited

U.S. PATENT DOCUMENTS

| | | | |
|---|---|---|---|
| 870,700 | 11/1907 | Thebus | 239/726 X |
| 3,490,380 | 1/1970 | Beckett | 239/724 X |
| 3,729,140 | 3/1973 | Wagner | 239/732 |
| 4,275,837 | 6/1981 | Baroni | 239/747 X |
| 4,726,529 | 2/1988 | Nislar | 239/742 |

FOREIGN PATENT DOCUMENTS 924353  4/1973  Canada ................... 239/724

Primary Examiner—Andres Kashnikow
Assistant Examiner—Patrick N. Burkhart
Attorney, Agent, or Firm—D. Ron Morrison

[57] ABSTRACT

A mobile agricultural water cannon to transfer water from sloughs and shallow ponds to adjoining land has (1) a suction pod to collect the water into a suction chamber, (2) a tail boom assembly to lower the suction pod into the water from adjoining land, (3) a suction boom to move the water through the tail boom assembly from the suction pod to a high pressure pump on the suction boom, and (4) a pressure boom to discharge the water from the high pressure pump; there is a priming pump on the suction pod to prime the high pressure pump. The suction and pressure booms are mounted on wheels, the other parts being attached to these to pivot between operating and transport positions for operation and towing by a motive power source which can power the high pressure pump and the priming pump, and pivot the tail boom assembly.

7 Claims, 4 Drawing Sheets

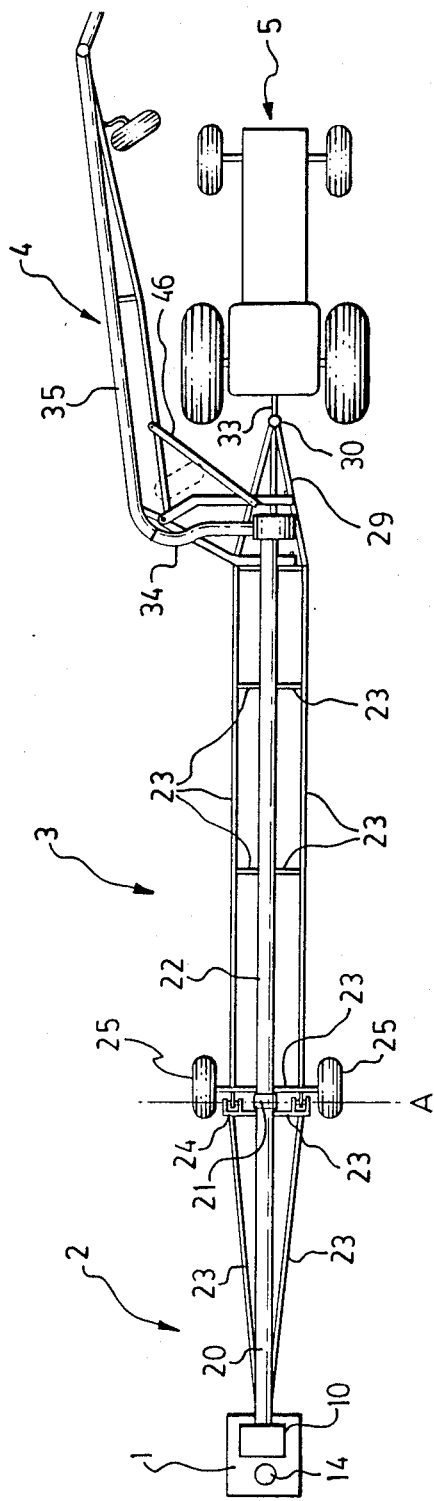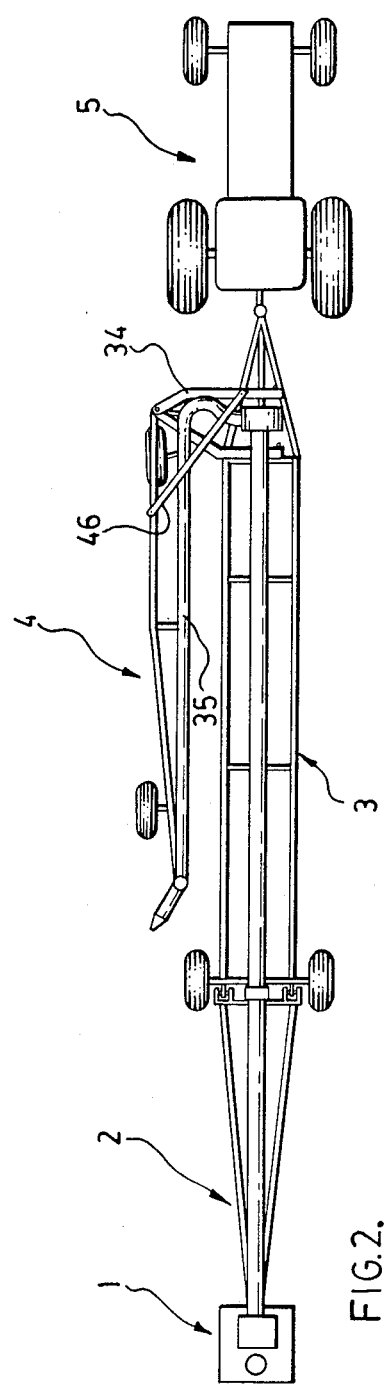
FIG.1.
FIG.2.

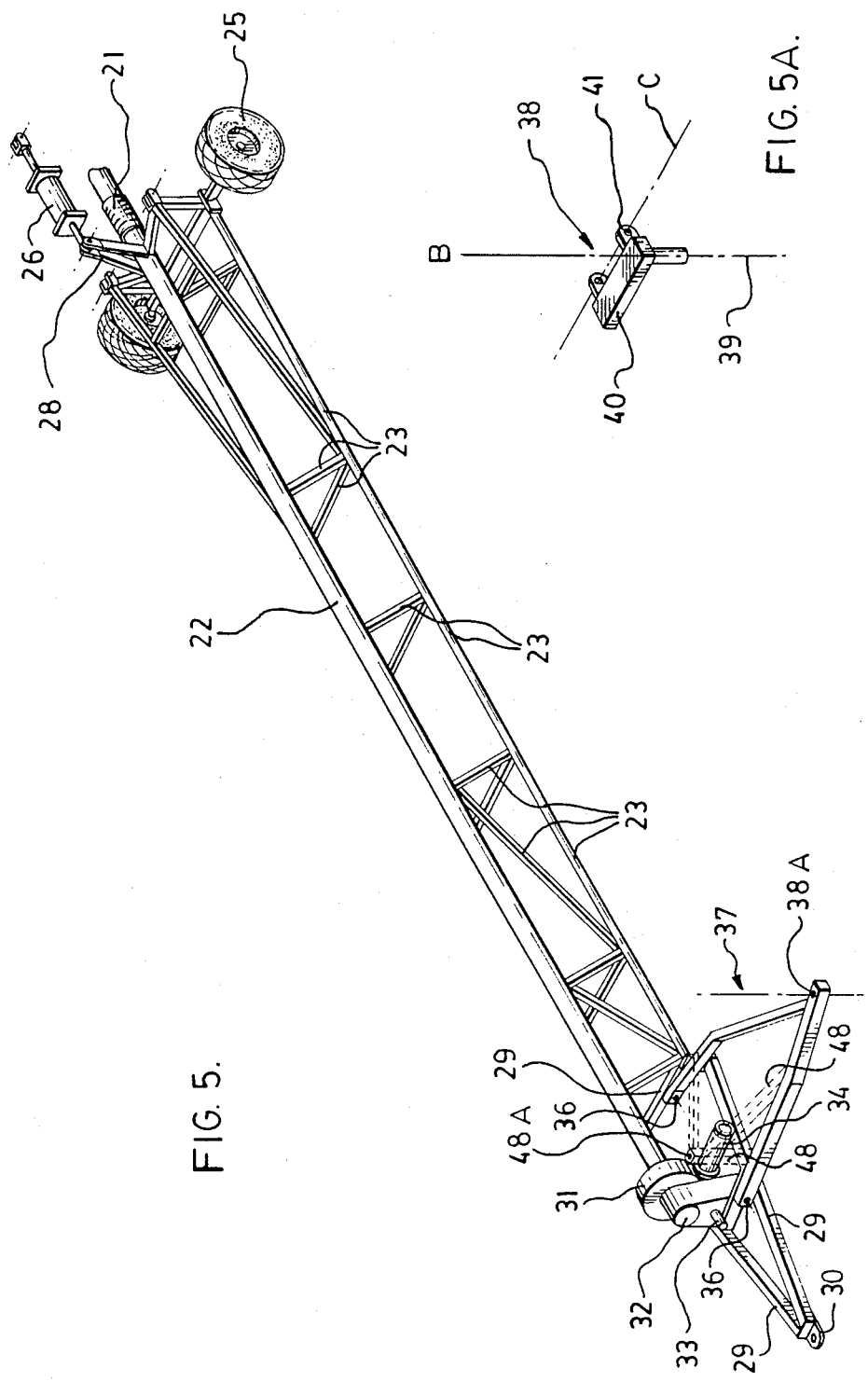

AGRICULTURAL WATER CANNON

This invention relates to a mobile water cannon and more particularly to a water cannon adapted to transfer water for agricultural or construction purposes. Still more particularly the invention relates to an agricultural implement which can transfer water from stagnant, wide, shallow ponds or sloughs onto adjacent agricultural lands.

Thousands of acres of agricultural land in the North American prairies are temporarily flooded each year from the spring snow melt and subsequent runoff. Many of these acres become dry enough later in the spring to permit late seeding of a commercially viable crop, some of the acres produce only slough hay, and some stagnant water bodies may never dry in the course of the summer. The stagnant ponds and sloughs, which may range in size from less than an acre to several acres, represent a major inconvenience and loss of revenue to the farming industry. Generally it is not practicable to attempt to drain such ponds and sloughs by gravity, because of the vast areas of substantially flat level land that surround them.

It is an object of this invention to provide an agricultural implement which can transfer water from a shallow pond or slough and distribute it over a wide area of adjacent drier land where it can be absorbed. It is a further object of the invention to provide a mobile implement which can be readily and quickly moved from one location to another, either around the same body of water or to different bodies of water, to transfer the water to land areas adjacent the water for purposes of irrigation.

The invention thus consists in an agricultural water cannon comprising:

A. a suction pod having
 (1) a flat horizontal base plate
 (2) a horizontal main plate attached to and vertically positioned over the base plate and spaced therefrom by apertures to permit ingress of water therebetween,
 (3) a valve attached to the main plate and covering an aperture in said main plate to permit unidirectional flow of water through said aperture from below to above the main plate,
 (4) a suction chamber sealingly fastened on top of the main plate around the valve and in open communication with the inlet end of an elongated rigid tail boom tube,
 (5) an immersible centrifugal pump, mounted outside said suction chamber and on top of the main plate with its inlet connected to a second aperture in said main plate and its discharge outlet connected to said suction chamber, and
 (6) power means to drive said immersible centrifugal pump, B. a tail boom assembly comprising:
 (1) said elongated rigid tail boom tube,
 (2) a flexible suction tube connecting the distal end of said tail boom tube to the inlet end of an elongated rigid suction boom tube aligned with said tail boom tube,
 (3) a hinged connection, hinging on a substantially horizontal axis transverse to said tail boom tube, supporting the distal end of said rigid tail boom tube at the inlet end of said rigid suction boom tube, and
 (4) power means to pivot said tail boom tube on the axis of said hinged connection, C. a suction boom assembly comprising:
 (1) said elongated rigid suction boom tube,
 (2) a pair of wheels mounted under the inlet end of said rigid suction boom tube to support said end and the tail boom assembly on the ground for transport purposes,
 (3) a framework to support the distal end of said suction boom tube and attachable to the drawbar hitch of an associated motive power source,
 (4) a high pressure, high volume, centrifugal pump mounted on said framework with its inlet connected to the distal end of said suction boom tube,
 (5) transmission means mounted on said framework to transmit rotary power from a power takeoff of said motive power source to the drive shaft of said centrifugal pump, and
 (6) a substantially horizontal rigid frame piece pivotally attached to said framework on a horizontal axis aligned substantially parallel to the longitudinal axis of said suction boom tube and substantially directly thereunder, said frame piece protruding horizontally to the side of said suction boom tube and supporting, at a location thereon distal to said hinge axis, a universal hinge having a vertical axis of rotation and a horizontal axis of rotation, and D. a pressure boom assembly comprising:
 (1) a rigid pressure boom framework, attached by said universal hinge to said rigid frame piece,
 (2) an elongated rigid pressure boom tube having its inlet end proximate said universal hinge and its distal end connected to a water dispersing nozzle,
 (3) at least one castor mounted wheel under and supporting on the ground said pressure boom framework and said pressure boom tube, and
 (4) a flexible pressure tube connecting the discharge of said high pressure centrifugal pump to the inlet of said pressure boom tube.

The invention will be more readily understood from the following detailed description thereof with reference to the accompanying drawings in which the same reference characters are used throughout when referring to identical parts in the different figures.

In the accompanying drawings:

FIG. 1 is a diagrammatic representation, in plan view, of the principal parts of an agricultural water cannon of the invention when it is in field position, i.e. operating mode;

FIG. 2 is a similar representation of the same machine folded for transport, i.e. in transport mode;

FIG. 5 is a representation, in isometric projection, of a suction boom assembly forming part of the invention;

FIG. 5A is part of a hinge, shown on a slightly larger scale, forming part of the assembly of FIG. 5.

The shallow water bodies or sloughs for which the invention is particularly adapted generally have a depth no greater than 50 or 100 centimeters. The invention permits such bodies of stagnant water to be pumped down to a depth in the range of four to eight centimeters, if the suction pod or intake of the equipment can be placed in the deepest part of the water body for final pumping.

Figure 3:
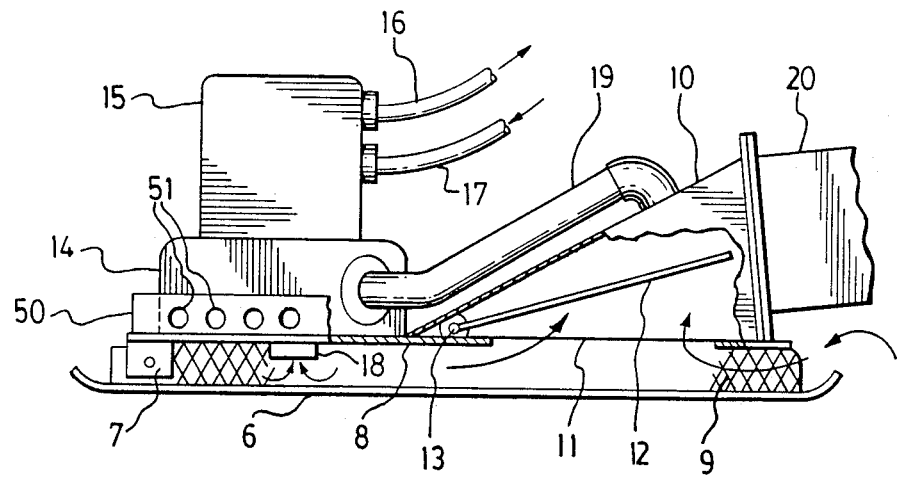
FIG. 3 is a diagrammatic representation, in elevation, of the principal parts of a suction pod forming part of the invention.

Turning now to the details of the invention shown in the drawings, in FIGS. 1 and 2 the illustrated agricultural water cannon, in both operating (FIG. 1) and transport (FIG. 2) positions, has first a suction pod, 1; greater detail of the suction pod is shown in FIG. 3. Adjacent the suction pod is a tail boom assembly, indicated generally as 2; adjacent the tail boom assembly is a suction boom assembly, indicated generally as 3. Adjacent the suction boom assembly in turn are a pressure boom assembly, indicated generally as 4, and a conventional motive power source, indicated generally as a tractor 5, which does not form part of the invention. Preferably the motive power source has a rotary power takeoff capable of driving a rotary shaft; also the power source preferably has hydraulic power lines and is adapted to provide hydraulic pressure for operation of hydraulic power means, for example hydraulic cylinders and hydraulic motors.

Turning now to FIG. 3, the suction pod comprises a generally flat, planar, rigid, horizontal base plate 6, which can rest on the bottom of a pond or slough and support the weight of the tail boom assembly 2. Attached to the base plate, conveniently by a hinge 7 and a releasable fastener (not shown) for example, is a generally flat horizontal main plate, 8, spaced above the base plate by a distance of approximately two to six centimeters to permit ingress of water between the plates. To preclude ingress of large solid objects between the plates it is preferable to have a screen or mesh, 9, (partially shown) covering the opening between the plates. Sealingly fastened on top of the main plate is a suction chamber, 10, shown partially cut away, covering part of the main plate. The suction chamber surrounds large aperture 11 through the main plate.

On top of the main plate inside the suction chamber there is a valve, for example a simple hinged plate, 12, attached by valve plate hinge 13; the valve permits water to enter the suction chamber from below the main plate, but precludes it flowing back out of the suction chamber through aperture 11. Also fastened on top of the main plate adjacent the suction chamber there is a small immersible power driven centrifugal priming pump, 14. The pump may be driven by an immersible electric motor but preferably is driven by an hydraulic motor, 15, powered through hydraulic lines, 16, 17, connected at their distal ends to the hydraulic pressure system of the tractor. The inlet 18 of the priming pump is placed in a second aperture in the main plate, and the discharge 19 of the priming pump is into the suction chamber 10. Sealingly attached to an aperture in the suction chamber is the inlet end of a rigid tail boom tube, 20, conveniently a steel pipe of 15 to 20 centimeters diameters for example.

Figure 4:
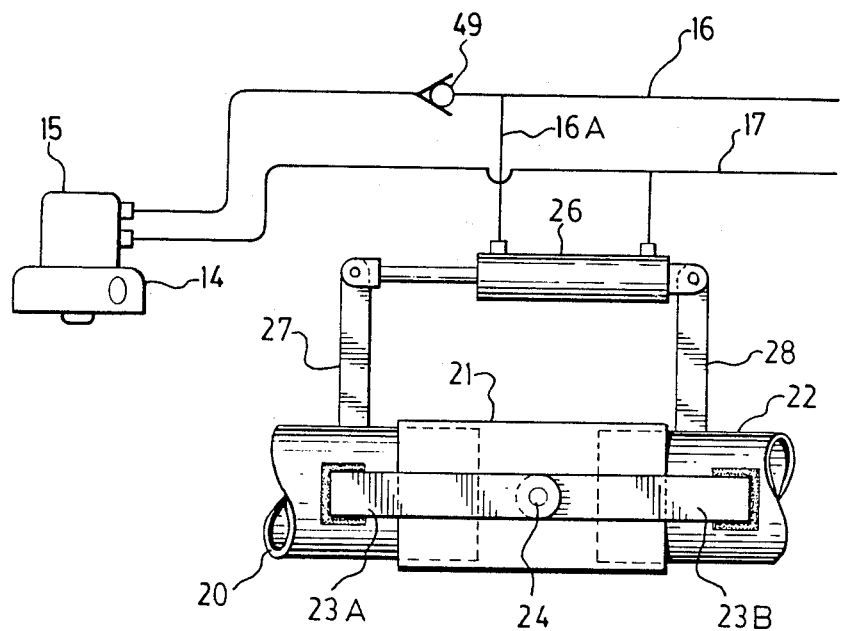
FIG. 4 is a diagrammatic representation, in elevation, of parts of a tail boom assembly forming part of the invention.

Referring now to FIGS. 1 and 4, the tail boom tube 20 is the main structural element of the tail boom assembly. The distal end of the tail boom tube is connected by a piece of flexible suction tubing 21 to the inlet end of a rigid suction boom tube, 22, conveniently also steel pipe the same diameter as the tail boom tube. Preferably the rigidity of the tail boom tube is reinforced by light structural members or framework, for example struts 23 which form a truss with the tail boom tube 20. The rigidity of suction boom tube 22 likewise is reinforced for example by additional struts 23, appropriately placed to form a truss with tube 22. At the distal end of the tail boom tube 20 a hinged connection 24 with the inlet end of the suction boom tube 22 is formed by the junction of pairs of struts 23A and 23B (FIG. 4) fastened on each side of tubes 20 and 22 respectively adjacent their respective ends. The connection hinges on a horizontal axis A, shown on FIG. 1.

The inlet end of suction boom tube 22 is supported by a pair of wheels 25, conveniently mounted for example under the struts forming a truss wit the tube 22. Through the hinged connection 24 the wheels 25 thus support the weight of the distal end of the tail boom assembly. As shown in FIG. 4, an hydraulic cylinder, 26, is mounted between lugs 27 and 28 fastened to the top of tubes 20 and 22 respectively. Preferably lug 27 is pivotally attached to tube 20 on an axis parallel to axis A, to facilitate extension of cylinder 26 as tubing 21 flexes and tube 20 hinges about axis A. Cylinder 26 is powered by hydraulic lines 16 and 17 from the tractor 5, in conjunction with the operation of the priming pump 14, as will be more fully explained later. Hydraulic line 16 contains an anti-back flow or non-return valve 49 and a branching hydraulic by pass line 16A. Contraction of cylinder 26 pivots the tube 20 around axis A of hinged connection 24 and raises the inlet end of tube 20 and the suction pod from the ground or from the bottom of the water, thus placing the entire weight of the suction pod and tail boom assembly on the wheels 25. With the weight of the suction pod and tail boom assembly thus carried on wheels 25, these elements are in a transport position and transported easily by pulling them with the suction boom assembly Turning now to FIG. 5, the distal end of suction boom tube 22 is attached to a sturdy framework, 29, which includes a hitch, 30, attachable to the conventional drawbar hitch of a tractor. The distal en of the suction boom tube is connected to the inlet of a high pressure, high volume, centrifugal pump, 31, mounted on the framework 29. The centrifugal pump must be capable of pumping a large volume of water at high pressure to a distribution nozzle on the pressure boom assembly 4. There are numerous pumps available commercially to do this; one example is the Berkeley Model B4JRMBH High Pressure Irrigation Pump. The centrifugal pump is driven by a transmission means 32, for example a belt and pulley connection to the power takeoff shaft, 33, of a tractor. The discharge of centrifugal pump 31 is connected to a short length of flexible pressure hose, 34, the distal end of which is connected to the inlet end 44 of an elongated rigid pressure boom tube, 35, (FIGS. 1 and 6), forming part of pressure boom assembly 4. Tube 35 also is conveniently a length of steel pipe, but adequately is of somewhat smaller diameter than that of the tubes 20 and 22.

Again referring to FIG. 5, attached to framework 29, preferrably hingedly on a substantially horizontal hinge axis preferably directly below the suction tube 22, for example at hinge points 36, is a substantially horizontal rigid frame piece 37. The frame piece 37 can conveniently be in the general shape of a horizontal A-frame as shown, but it could also be any other, generally planar, shape. On the frame piece 37, remote from the hinge axis, a universal hinge 38 connects the frame piece to the pressure boom assembly 4. A convenient form of universal hinge is shown in FIG. 5A. This comprises a vertical cylindrical shaft, 39, which fits through a vertical hole 38A in the distal part of frame piece 37, and a pair of lugs, 41, on a horizontal bar 40 fastened to the top of shaft 39. The lugs have a pair of aligned holes therein through which can pass a hinge pin to hold the lugs in alignment with a similar pair of lugs on the pressure boom assembly. The vertical shaft 39 forms the vertical axis B of the universal hinge and the hinge pin forms the horizontal axis C of the universal hinge. With this connection, the pressure boom assembly is able to pivot on the axis B around frame piece 37 to move from transport to operating position and to pivot on axis C relative to the frame piece when the water cannon is being moved from one location to another over uneven ground in the transport position. Obviously the details of the universal hinge can be altered and still provide the desired vertical and horizontal axes of rotation for pressure boom assembly 4 to pivot relative to the frame piece 37.

Figure 6:
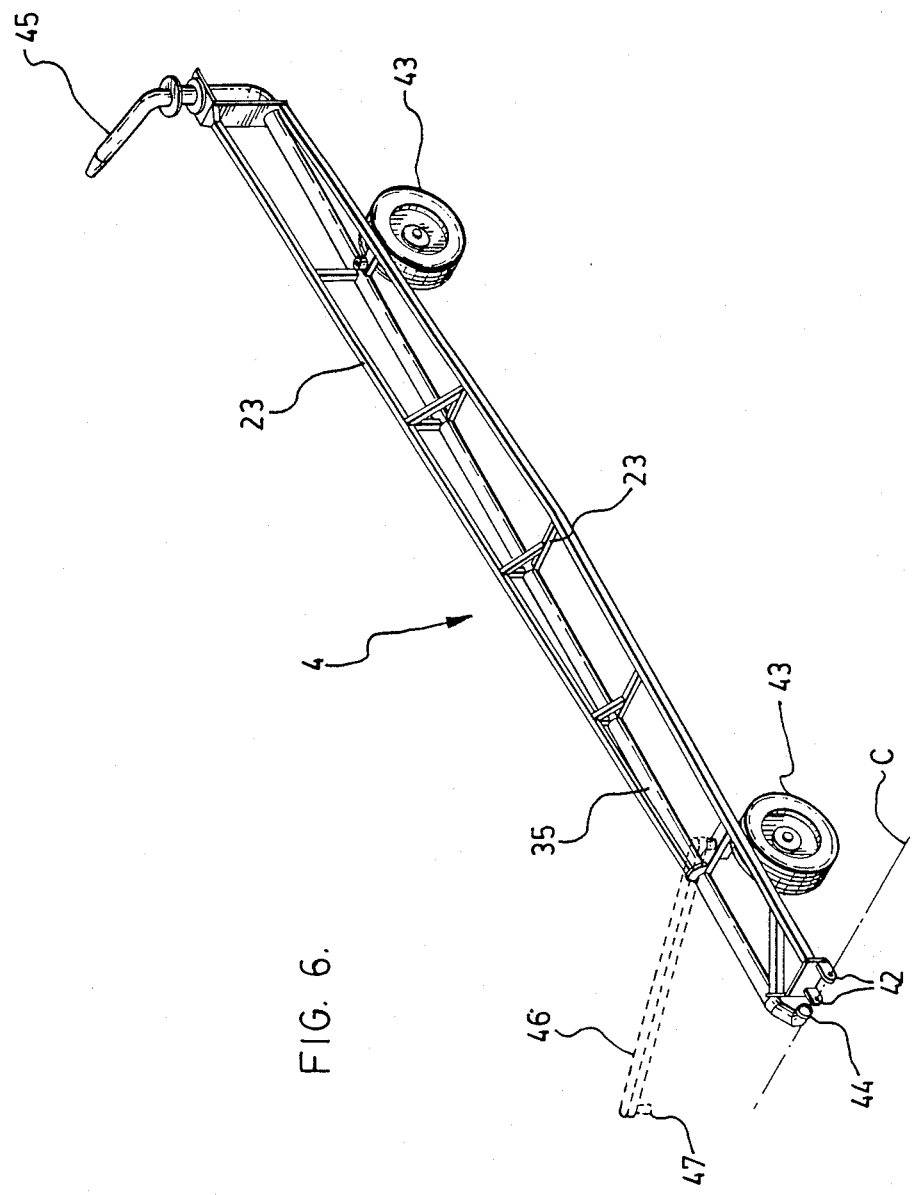
FIG. 6 is a diagrammatic isometric projection of the essential parts of a pressure boom assembly forming part of the invention.

Turning now to FIG. 6, the principal structural member of the pressure boom assembly is the rigid tube 35 whose rigidity is reinforced by framework, for example struts 23 similar to those used with tubes 20 and 22. At the inlet end of tube 35 the framework of the pressure boom assembly has a pair of lugs, 42, matching lugs 41 on horizontal bar 40, the lugs 42 having a pair of aligned holes to receive the hinge pin forming part of the universal hinge 38. The weight of the pressure boom assembly may be carried partly by the hinge 38 and the remainder by at least one castor mounted wheel, 43, under the boom assembly. Preferably two such castor mounted wheels are used, for example as shown, appropriately spaced along the length of the pressure boom assembly for greater stability. At the distal end of tube 35 there is mounted a nozzle, 45, preferably a rain gun or oscillating nozzle of an agricultural sprinkler, for example a "Rain Bird" (trademark) Rain Gun 250G impact sprinkler or a Nelson "P200 Big Gun" (trademark) agricultural sprinkler. Such commercially available nozzles are designed to operate with water pressures in the range from 50 to 150 pounds per square inch (345 to 1035 KPa), and to deliver water in the amounts between about 300 and about 1200 US gallons per minute (1100 to 4400 liters per minute) over a range up to 275 feet (84 meters) from the nozzle. The nozzle is preferrably mounted to spray a jet of water over an adjustable arc around the distal end of the pressure boom.

Because there is considerable reaction to the water jet at the nozzle, the reaction tends to pivot the pressure boom assembly around the vertical axis of the universal hinge 38, particularly when the nozzle is oscillating and directed at right angles to the longitudinal axis of the pressure boom assembly in the operating position. Furthermore, when the water cannon is in the transport configuration and is being towed along a roadway, the castoring wheel or wheels of the pressure boom assembly permit the pressure boom assembly to vary from a straight line path parallel to the direction of travel of the suction boom assembly, alongside which it is intended to travel; such variation is a hazard to oncoming traffic. Therefore, to stabilize the pressure boom assembly in a stationary position when the water cannon is operating, and to stabilize it in a position parallel to the suction boom assembly when they are being transported, it is preferred to have a stabilizer bar, 46, (FIG. 6) pivotally attached to each of the pressure boom assembly 4 and a part of the frame piece 37. Bar 46 is shown in dotted lines in FIG. 6, and includes its pivotal attachment to the framework of pressure boom assembly 4. The distal end of bar 46 has a pivot axle 47 which connects it with frame piece 37, conveniently on top of additional framework or stabilizer bar support 48, rigidly fastened to framepiece 37 and shown in dotted lines in FIG. 5. A vertical aperture 48A in the top of the bar support 48 receives the pivot axle 47, thereby connecting the stabilizer bar 46 pivotally to the frame piece 37. To accommodate the pivotal movement of pressure boom assembly 4 around the axis B (FIG. 5) with stabilizer bar 46 also pivotally attached to both the pressure boom assembly and the frame piece 37, it is obvious that the stabilizer bar must be extensible if the pivotal attachments at the ends thereof are to remain in place during pivoting. This is readily achieved by having the stabilizer bar 46 made up with a telescoping structure and, to ensure rigidity of the telescoping structure when the pressure boom assembly is not being pivoted, it must have means to lock it in a telescoped position. With a telescoping stabilizer bar locked into the contracted condition and attached to both the pressure boom assembly 4 and the frame piece 37, in either the transport mode or the pumping mode of the water cannon, the pressure boom assembly is held rigidly in position relative to the position of the suction boom assembly. Thus the pressure boom assembly is resistant to the reaction of the water jet when the nozzle is operating, and is constrained from diverging from a path parallel to that of the suction boom assembly when the latter is being towed along a roadway.

A brief explanation of the method of operating the invention will now be given. To begin, the agricultural water cannon in transport position (FIG. 2) is towed to location beside a shallow body of water it is desired to pump onto adjoining land. Conveniently it is towed with a tractor which also provides the power take-off required to drive the high pressure centrifugal pump as well as providing the hydraulic pressure utilized to power the hydraulic cylinder for raising and lowering the tail boom assembly and power the hydraulic priming pump. The tractor and water cannon are aligned in the transport position a short distance from the body of water with the tractor facing away from the water body and the pressure boom assembly free of any constraint to pivoting on universal hinge 38. The tractor is then backed towards the body of water, pushing the suction boom assembly and tail boom assembly directly towards the water body. Because of the castor mounting of the wheel or wheels under the pressure boom, the pressure boom does not remain parallel to the suction boom, but pivots on the vertical axis of universal hinge 38 as the latter pushes the pressure boom towards the water body. The castoring wheels thus move the pressure boom assembly around the vertical axis of universal hinge 38 as the latter moves towards the water body with the suction boom assembly, until the two assemblies achieve the relative positions or operating mode configuration shown in FIG. 1; then the stabilizer bar 46 is locked, either automatically or manually. Backward movement of the tractor is continued until the suction pod and tail boom assembly are over the water body. Comparable immobility of the pressure boom assembly could be achieved, for example, merely by fastening it with a chain to a stake driven securely into the ground. With the water cannon thus aligned in the operating mode, the hydraulic cylinder 26 (FIG. 4) is activated by hydraulic pressure, most conveniently from the tractor through hydraulic lines 16 and 17. The cylinder is activated to extend the piston thereof by applying pressure through line 17, thus pivoting lug 27 and tail boom tube 20 around hinged connection 24 to lower suction pod 1 into the water and bring it to rest on the bottom of the water body. Hydraulic fluid from the cylinder 26 returns to the tractor through lines 16A and 16 as the piston extends. Thereafter, pressure in line 17 tends to extend the piston of cylinder 26 and rotate lug 27 away from the body of the cylinder 26 until the latter has extended to its limit. Because hydraulic line 17 continues beyond cylinder 26 to hydraulic motor 15, continued pressure in line 17 initiates rotation of hydraulic motor 15 and centrifugal priming pump 14, which is the route of least resistance for the return flow of hydraulic fluid through line 16 to the tractor after cylinder 26 is extended to its limit. When the water priming cycle is completed, the hydraulic circuit is de-activated.

To raise the suction pod and tail boom assembly out of the water body, hydraulic pressure is applied through line 16 from the tractor, thence through line 16A to the hydraulic cylinder 26, thus retracting the piston thereof as hydraulic fluid returns to the tractor through line 17. The anti-backflow valve 49 prevents the application of hydraulic pressure through line 16 to hydraulic motor 15. Thus hydraulic motor 15 can be rotationally driven only in one direction, i.e. by pressure applied through line 17. When suction pod 1 is held off the ground, by hydraulic cylinder 26, its weight tends to rotate suction tube 20 around hinged connection 24 in the direction to extend the piston of cylinder 26. Thus pressure applied through line 17 is assisted by the weight of suction pod 1 until the latter is resting on the ground or on the bottom of the water body. With this arrangement of the hydraulic lines, both the positioning of the tail boom assembly and operation of the hydraulically driven priming pump can be achieved with one hydraulic circuit from the tractor.

Referring now to FIGS. 3, 5, and 6, with the suction pod resting at the bottom of the water body and the priming pump driven by operation of the hydraulic motor, water is pumped into suction chamber 10 on top of valve plate 12, which closes to keep the water in chamber 10 and force water to flow up into tail boom tube 20, thence through flexible suction tube 21 and suction boom tube 22 into the inlet of high pressure centrifugal pump 31. When pump 31 has been thus primed, i.e. filled with water, its pumping action can be started by initiating rotation of the tractor power take-off shaft 33 driving transmission 32 and pump 31. Commercial high pressure centrifugal irrigation pumps used in this invention generally are capable of sucking water up to 15 feet (4.6 meters) vertically above the surface of the water source to the centerline of the pumps impeller, once they are primed. Thus the elongated tail boom assembly and suction boom assembly generally should be placed to avoid positioning the high pressure pump more than the foregoing vertical distance above the lowest level to which it is desired to lower the water body. Once the high pressure pump has been started, operation of the priming pump can be discontinued by stopping the hydraulic motor. The high pressure pump 31 sucks water from around the suction pod, through the screen 9 and between base plate 6 and main plate 8, through aperture 11 forcing open valve plate 12, into suction chamber 10, thence up tubes 20 and 22 to the impeller of the pump; the pump then forces water through the flexible pressure hose 34 and pressure boom tube 35 to oscillating nozzle or rain gun 45. A nozzle that can oscillate through a 270 degree arc to distribute water supplied to a 1.88 inch (4.78 cm) nozzle bore at a rate of 1000 U.S. gallons per minute (3787 liters/minute) can irrigate 4.12 acres (1.67 hectares) under calm air conditions. At the foregoing rate of pumping, an acre-foot of water (about 327,000 U.S. gallons or 1.24 million liters) can be pumped out of a slough in less than five and one half hours, and spread over 4.12 acres (1.67 hectares).

With a suction pod having a main plate spaced above a base plate by approximately two to five centimeters, and preferably with perforated shielding projecting upwardly, for example from seven to fifteen centimeters, above and from the main plate around its perimeter, to reduce eddying of the water being sucked into the pod as the water becomes shallow, the high pressure pump can lower the depth of water in which the pod rests to as low as five to eight centimeters. One type of shielding suitable to reduce eddying is shown, partially cut away, in FIG. 3. It comprises simply a small vertical wall or flange, 50, fastened to the top of the main plate around its perimeter and having perforations, 51, therethrough to permit water to flow through the shielding but at the same time impede its flow in an inwardly spiraling direction towards the aperture 11 in the main plate. With the shielding, the water flows more readily in a radially inward direction to the aperture 11 rather than spirally.

When the water body becomes so shallow that the high pressure pump cannot maintain suction in the suction chamber, the pump must be stopped and the remainder of the water body can be allowed to evaporate in the sun and/or soak into the soil. The water cannon can be moved to another location by first activating hydraulic cylinder 26 to raise the tail boom assembly until the suction pod is off the ground or bottom of the water body. For transport purposes it is prudent to lock the tail boom in the raised position with a safety chain, safety catch, or locking pin of some kind, so that release of the hydraulic pressure on cylinder 26 does not permit the tail boom assembly to drop. With the pressure boom assembly then released from any constraint to its rotation around the vertical axis of universal hinge 38, the water cannon is pulled forward by the tractor. The castoring wheel or wheels under the pressure boom assembly permit the latter to pivot around hinge 38 as the suction boom assembly moves forward until the pressure boom assembly swings beside it and takes up a position substantially parallel thereto for transport, as shown in FIG. 2. The pressure boom assembly should then be locked in this position for example by stabilizer bar 46 or a safety chain, so that the water cannon can safely be pulled along roadways in two way traffic.

Numerous modifications can be made in the various elements of the combination just described as comprising the invention. For example, it may be desirable to have drain cocks in some of the various suction tubes, pressure tubes, and centrifugal pump connections just described, to facilitate draining of water therefrom when the water cannon is to be drained for transport or to avoid danger from freezing of water therein, or to facilitate bleeding of air from suction tubes when the high pressure centrifugal pump is being primed.

Numerous other modifications may be made in the specific expedients described without departing from the applicants invention, the scope of which is defined in the following claims.

What is claimed is:
1. An agricultural water cannon comprising:
   A. a suction pod having
      (1) a flat horizontal base plate
      (2) a horizontal main plate attached to and vertically positioned over the base plate and spaced there- from by apertures to permit ingress of water therebetween, (3) a valve attached to the main plate and covering an aperture in said main plate to permit unidirectional flow of water through said aperture from below to above the main plate, (4) a suction chamber sealingly fastened on top of the main plate around the valve and in open communication with the inlet end of an elongated rigid tail boom tube, (5) an immersible centrifugal pump, mounted outside said suction chamber and on top of the main plate with its inlet connected to a second aperture in said main plate and its discharge outlet connected to said suction chamber, and (6) power means to drive said immersible centrifugal pump, B. a tail boom assembly comprising:

(1) said elongated rigid tail boom tube, (2) a flexible suction tube connecting the distal end of said tail boom tube to the inlet end of an elongated rigid suction boom tube aligned with said tail boom tube, (3) a hinged connection, hinging on a substantially horizontal axis transverse to said tail boom tube, supporting the distal end of said rigid tail boom tube at the inlet end of said rigid suction boom tube, and (4) power means to pivot said tail boom tube on the axis of said hinged connection, C. a suction boom assembly comprising:

(1) said elongated rigid suction boom tube, (2) a pair of wheels mounted under the inlet end of said rigid suction boom tube to support said end and the tail boom assembly on the ground for transport purposes, (3) a framework to support the distal end of said suction boom tube and attachable to the drawbar hitch of a motive power source, (4) a high pressure, high volume, centrifugal pump mounted on said framework with its inlet connected to the distal end of said suction boom tube, (5) transmission means mounted on said framework to transmit rotary power from a power takeoff of said motive power source to the drive shaft of said centrifugal pump, and (6) a substantially horizontal rigid frame piece pivotally attached to said framework on a horizontal axis aligned substantially parallel to the longitudinal axis of said suction boom tube and substantially directly thereunder, said frame piece protruding horizontally to the side of said suction boom tube and supporting, at a location thereon distal to said hinge axis, a universal hinge having a vertical axis of rotation and a horizontal axis of rotation, and D. a pressure boom assembly comprising:

(1) a rigid pressure boom framework, attached by said universal hinge to said rigid frame piece, (2) an elongated rigid pressure boom tube having its inlet end proximate said universal hinge and its distal end connected to a water dispersing nozzle, (3) at least one castor mounted wheel under and supporting on the ground said pressure boom framework and said pressure boom tube, and (4) a flexible pressure tube connecting the discharge of said high pressure centrifugal pump to the inlet of said pressure boom tube.

2. An agricultural water cannon as claimed in claim 1 and further comprising a motive power source having (1) a rotary power takeoff adapted to drive said transmission means and (2) hydraulic power lines adapted to provide hydraulic pressure for operation of hydraulic power means.

3. An agricultural water cannon as claimed in claim 2 in which the power means to drive the immersible centrifugal pump is an hydraulic motor connected by hydraulic power lines to said motive power source.

4. An agricultural water cannon as claimed in claim 3 in which the power means to pivot said tail boom tube on the axis of its hinged connection to said suction boom tube is an hydraulic cylinder and piston connected by hydraulic power lines to said motive power source.

5. An agricultural water cannon as claimed in claim 4 in which the hydraulic power lines from the motive power source to the said hydraulic motor and said hydraulic cylinder comprise a pressure line connecting pressure from the motive power source directly to the hydraulic motor and the hydraulic cylinder to extend the latter, and a return pressure line connecting pressure from the motive power source directly to the hydraulic cylinder to retract the latter and a return line from the hydraulic motor to said return pressure line, said return line having an anti-backflow valve precluding application of pressure from said return pressure line to said hydraulic motor.

6. An agricultural water cannon as claimed in claim 5 in which the transmission means to transmit rotary power to the drive shaft of said high pressure centrifugal pump from said power takeoff of said motive power source is a belt and pulley connection.

7. An agricultural water cannon as claimed in claim 1 in which the suction pod has perforated shielding means projecting upwardly from and around the perimeter of said main plate and adapted to reduce eddying of shallow water being sucked into the pod.

* * * * *